United States Patent
Coyne et al.

(10) Patent No.: US 11,325,291 B2
(45) Date of Patent: May 10, 2022

(54) DUAL TORQUE AND INJECTION MOLDING DEVICE

(71) Applicant: Ford Motor Company, Dearborn, MI (US)

(72) Inventors: Christopher William Coyne, Dearborn, MI (US); Samuel Jeffrey Tomlinson, Farmington Hills, MI (US)

(73) Assignee: Ford Motor Company, Dearborn, MI (US)

( * ) Notice: Subject to any disclaimer, the term of this patent is extended or adjusted under 35 U.S.C. 154(b) by 248 days.

(21) Appl. No.: 16/275,974

(22) Filed: Feb. 14, 2019

(65) Prior Publication Data

US 2020/0262116 A1    Aug. 20, 2020

(51) Int. Cl.
*B29C 45/14* (2006.01)
*B29L 31/34* (2006.01)

(52) U.S. Cl.
CPC ... *B29C 45/14819* (2013.01); *B29C 2045/1486* (2013.01); *B29L 2031/3406* (2013.01)

(58) Field of Classification Search
CPC ... B25B 21/002; B25B 21/007; B25B 21/008; B25B 23/147; B25B 13/06; B25B 13/065; B25B 13/485; F16B 39/021; F16B 33/004; F16B 37/14; F16B 41/005; B29C 45/14377; B29C 45/14426; B29C 45/14639
See application file for complete search history.

(56) References Cited

U.S. PATENT DOCUMENTS

| | | | | |
|---|---|---|---|---|
| 3,238,287 A | * | 3/1966 | Chapman | B29C 45/14426 264/276 |
| 3,273,430 A | * | 9/1966 | Knudsen | B25B 13/065 81/124.6 |
| 3,354,757 A | * | 11/1967 | Grimm | B25B 13/04 81/176.1 |
| 3,495,485 A | * | 2/1970 | Knudsen | B25B 13/065 81/124.6 |
| 3,675,516 A | * | 7/1972 | Knudsen | B25B 13/065 81/124.6 |
| 4,607,547 A | * | 8/1986 | Martus | B25B 13/065 30/168 |
| 4,905,931 A | * | 3/1990 | Covey | B64D 45/02 244/1 A |

(Continued)

FOREIGN PATENT DOCUMENTS

| CN | 202846435 | 4/2013 |
|---|---|---|
| CN | 107598841 | 1/2018 |

(Continued)

*Primary Examiner* — Christopher M Koehler
(74) *Attorney, Agent, or Firm* — Burris Law, PLLC (57) ABSTRACT

A tool for driving a threaded fastener includes a driver head, a motor, and an injector. The driver head includes a spindle rotatable about an axis. A distal end of the spindle defines a plurality of drive surfaces configured to engage mating drive surfaces on the fastener to rotate the fastener about the axis. The driver head defines a fluid passage having an outlet proximate to the distal end of the spindle. The motor is drivingly coupled to the spindle to rotate the spindle about the axis. The injector is coupled to an inlet of the fluid passage and configured to feed a liquid insulator through the fluid passage.

11 Claims, 7 Drawing Sheets

(56) References Cited

U.S. PATENT DOCUMENTS

| | | | |
|---|---|---|---|
| 4,971,745 A * | 11/1990 | Ferenc | B29C 45/14336 264/263 |
| 5,123,310 A * | 6/1992 | McManus | B25B 13/06 81/121.1 |
| 5,782,148 A * | 7/1998 | Kerkhoven | B25B 13/065 81/121.1 |
| 6,022,210 A | 2/2000 | Gunther | |
| 7,107,879 B1 * | 9/2006 | Cheng | B25B 13/04 81/121.1 |
| 7,131,183 B2 | 11/2006 | Burchett et al. | |
| 7,188,552 B1 * | 3/2007 | Koppenhoefer | B25B 13/06 81/125 |
| 7,540,076 B2 | 6/2009 | Blais | |
| 8,297,836 B2 | 10/2012 | Kuntz et al. | |
| 9,498,878 B2 | 11/2016 | Barker | |
| 9,787,020 B2 | 10/2017 | Choi et al. | |
| 10,003,112 B1 | 6/2018 | Boor et al. | |
| 2004/0149088 A1 * | 8/2004 | Yamamoto | F16B 23/0061 81/121.1 |
| 2007/0289426 A1 * | 12/2007 | Chaconas | B25B 27/18 84/52 |
| 2008/0245195 A1 * | 10/2008 | Lee | B25B 27/18 81/124.6 |
| 2011/0117238 A1 | 5/2011 | Gunther et al. | |
| 2014/0284399 A1 | 9/2014 | Günther et al. | |
| 2015/0086295 A1 * | 3/2015 | Cameron | F16B 21/04 411/429 |
| 2015/0108685 A1 * | 4/2015 | Pajel | B29C 48/09 264/275 |
| 2016/0136859 A1 * | 5/2016 | Song | B05C 17/00516 411/82.1 |
| 2017/0014980 A1 * | 1/2017 | Doroslovac | B25B 13/08 |
| 2017/0036381 A1 * | 2/2017 | Song | B29C 35/02 |
| 2018/0034207 A1 | 2/2018 | Czech et al. | |
| 2018/0050364 A1 * | 2/2018 | Larrabee | F16B 39/021 |

FOREIGN PATENT DOCUMENTS

| | | |
|---|---|---|
| CN | 207954485 | 10/2018 |
| EP | 2952324 | 12/2015 |
| EP | 3092115 | 11/2016 |

* cited by examiner

DUAL TORQUE AND INJECTION MOLDING DEVICE

FIELD

The present disclosure relates to drivers and methods for installing threaded fasteners, and more specifically to threaded fasteners in electrical applications.

BACKGROUND

The statements in this section merely provide background information related to the present disclosure and may not constitute prior art.

Some components in high voltage electrical systems (e.g., terminals in electric vehicle traction batteries) include threaded fasteners that carry a high voltage (e.g., greater than 300 volts). In some situations, it is beneficial to construct the terminal such that fingers or other objects cannot accidently touch these fasteners. However, in some applications, it can be beneficial for these high voltage fasteners remain accessible to authorized and trained personnel for service, while still inhibiting accidental contact.

The present disclosure addresses these issues associated with high voltage threaded fastener installation.

SUMMARY

This section provides a general summary of the disclosure and is not a comprehensive disclosure of its full scope or all of its features.

In one form, a tool for driving a threaded fastener includes a driver head, a motor, and an injector. The driver head includes a spindle rotatable about an axis. A distal end of the spindle defines a plurality of drive surfaces configured to engage mating drive surfaces on the fastener to rotate the fastener about the axis. The driver head defines a fluid passage having an outlet proximate to the distal end of the spindle. The motor is drivingly coupled to the spindle to rotate the spindle about the axis. The injector is coupled to an inlet of the fluid passage and configured to feed a liquid insulator through the fluid passage. In a variety of alternate forms of the present disclosure: the spindle defines a recess configured to receive a tool engagement portion of the fastener, the drive surfaces at least partially defining the recess; the spindle defines the fluid passage and the outlet opens to the recess; the drive surfaces are disposed on walls that extend radially inward from perimeter walls of the recess; the drive surfaces are disposed on at least one protrusion of the distal end of the spindle, the at least one protrusion configured to be received in at least one recess of the fastener; the spindle defines the fluid passage coaxial with the axis; the driver head further comprises a sleeve axially translatable relative to the spindle and disposed coaxially about the spindle, the sleeve at least partially defining a mold cavity that encapsulates a tool engagement portion of the fastener; the sleeve defines the fluid passage; spindle at least partially defines the mold cavity; the sleeve includes a plurality of sleeve members that are radially movable relative to the spindle between a first radial position and a second radial position, wherein when the sleeve members are in the second radial position the sleeve members are closer to the axis than when in the first radial position and the sleeve members cooperate to at least partially define the mold cavity; mold cavity has a perimeter shape that is different than a perimeter shape of the tool engagement portion of the fastener; the drive head further comprises an injection shaft that defines the fluid passage and is axially translatable relative to the spindle, wherein the spindle is disposed coaxially about the injection shaft.

In another form, a tool for driving a threaded fastener includes a driver head and a motor. The driver head defines an injection mold cavity and a fluid conduit. The driver head includes a fastener engagement portion configured to engage a tool engagement portion of the fastener. The fastener engagement portion and the mold cavity are coaxially disposed about an axis. An outlet of the fluid conduit is open to the mold cavity. The mold cavity is configured to surround the tool engagement portion of the fastener. The motor is drivingly coupled to the fastener engagement portion to rotate the fastener engagement portion about the axis. In a variety of alternate forms of the present disclosure: the driver head includes a spindle that is rotatable about the axis, wherein a proximal end of the spindle is drivingly coupled to the motor to receive torque therefrom and a distal end of the spindle includes the fastener engagement portion and defines the mold cavity; the driver head includes a spindle and a sleeve, wherein the spindle is rotatable about the axis and the sleeve is coaxially disposed about the spindle, wherein the mold cavity is at least partially defined by the sleeve; the driver head includes a spindle and an injection shaft, wherein the spindle is rotatable about the axis and coaxially disposed about the injection shaft, wherein the injection shaft is axially translatable relative to the spindle.

In yet another form, a method of installing a threaded fastener includes aligning a driver head of a tool coaxially with the fastener, tightening the fastener by rotating a spindle of the driver head to engage and rotate a tool engagement portion of the fastener until the fastener is in an installed state, and encapsulating at least the tool engagement portion of the fastener by ejecting a liquid insulator from the driver head onto the installed fastener and allowing the insulator to solidify and form an electrically insulating cap around at least the tool engagement portion of the fastener. In a variety of alternate forms of the present disclosure: the method further includes retracting the spindle axially away from the fastener and positioning an injection shaft proximate to the tool engagement portion of the fastener, the injection shaft being coaxial with the spindle and defining a fluid conduit through which the liquid insulator is ejected; the method further includes retracting the spindle axially away from the fastener and positioning a sleeve of the driver head so that at least the tool engagement portion of the fastener is within a mold cavity that is at least partially defined by the sleeve, wherein the sleeve is movable relative to the spindle and disposed coaxially about the spindle, and wherein the liquid insulator is ejected from the sleeve, the spindle, or both the sleeve and the spindle; the sleeve is defined by a plurality of sleeve members, the method further comprising forming the mold cavity by moving the sleeve members radially inward toward the fastener.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. Examples are provided to fully convey the scope of the disclosure to those who are skilled in the art. Numerous specific details are set forth such as types of specific components, devices, and methods, to provide a thorough understanding of variations of the present disclosure. It will be apparent to those skilled in the art that specific details need not be employed and that the examples provided herein, may include alternative embodiments and are not intended to limit the scope of the disclosure. In some examples, well-known processes, well-known device structures, and well-known technologies are not described in detail.

Figure 1:
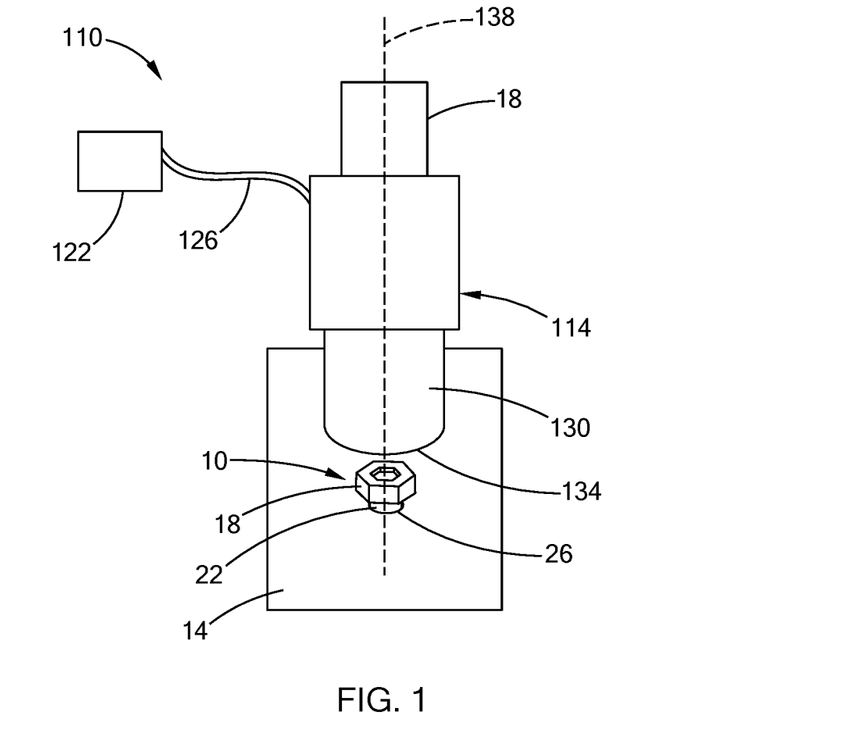
FIG. 1 is a perspective view of a driver of a first construction in accordance with the teachings of the present disclosure, illustrating an example of a fastener to be installed.

Referring to FIG. 1, a tool 110 is illustrated positioned above an example fastener 10 and a component 14. The fastener 10 is a threaded fastener (e.g., a screw, a bolt, or a nut) that is installed on the component 14 by torquing the fastener relative to the component 14 or relative to a mating part of the fastener (e.g., a nut or bolt). In the example provided, the fastener 10 is a bolt having a head 18 and a shaft 22. The shaft 22 is received in a bore 26 of the component 14 and either threadably engaged with a nut (not shown) on the opposite side of the component 14 or threads in the bore 26. In the example provided, the component 14 is a component of a high voltage device, such as a vehicle battery or other part of an electrical system of an electric vehicle (not shown), though other configurations can be used. The fastener 10 can be configured to secure a component that carries electrical current or is at a high voltage (e.g., an electrical terminal 30 for an electrical cable 34, shown in FIGS. 18-20). As such, the component 14 can be configured such that the fastener 10 can become electrically charged when in operation on the vehicle (not shown).

The tool 110 includes a driver head 114 and a motor 118. The tool 110 can also include an injection molding supply configured to provide an electrically insulating material in liquid form to the driver head 114. In the example provided, the electrically insulating material is supplied in liquid form by an injector 122 via a conduit 126, though other configurations can be used. The injector 122 can be any suitable device configured to convey the liquid material to the driver head 114, such as a pump for example. The injector 122 can be mounted for movement with the driver head 114 or can be remote from the driver head 114. In one configuration, the injector 122 can also be configured to receive the electrically insulating material in solid form and convert (e.g., melt) it to liquid form. One non-limiting example of such an electrically insulating material can be an electrically insulating polymer, though other materials can be used.

The driver head 114 includes a spindle 130 that has a distal end 134 generally configured to impart torque to the fastener 10. The motor 118 is drivingly coupled to the spindle 130 (e.g., near an opposite end of the spindle 130) and configured to rotate the spindle 130 about the spindle's rotational axis 138. In one configuration, the driver head 114 can be coupled to a robotic arm (not shown). In another configuration, the driver head 114 can be coupled to a handle (not shown) to be used as a hand tool. Other configurations can be used, such as mounted to another type of machine (not shown) configured to move the driver head 114 relative to the component 14 or vice versa.

Figure 2:
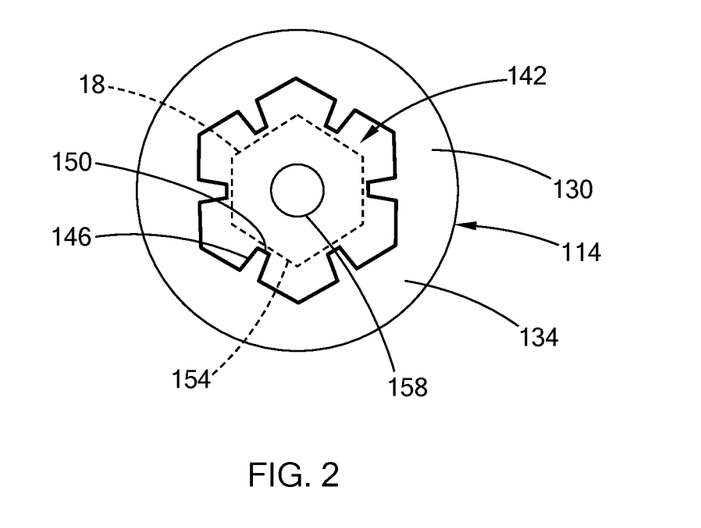
FIG. 2 is a bottom view of a spindle of the driver of FIG. 1, illustrating a positioning of a head of the fastener of FIG. 1 in dashed lines.
Figure 3:
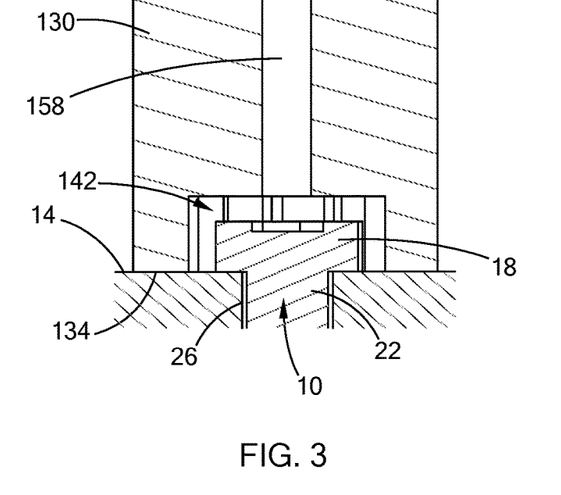
FIG. 3 is a cross-sectional view of the spindle and head of the fastener of FIG. 2.

Referring to FIGS. 2 and 3, the distal end 134 of the spindle 130 defines a mold cavity 142 and includes a plurality of engagement members 146 that extend radially inward from the perimeter of the mold cavity 142. In the example provided, the mold cavity 142 is a hexagonal shape and the engagement members 146 are protruding walls that extend radially inward from approximately the mid-sections of each hexagonal wall of the mold cavity 142, though other configurations can be used. In one alternative configuration, not specifically shown, the mold cavity 142 can be round and the engagement members 146 can extend radially inward from the cylindrical wall.

Returning to the example provided, the engagement members 146 have drive surfaces 150 configured to contact tool engagement surfaces 154 of the fastener 10. In the example provided, the head 18 of the fastener 10 is a hexagonal shape and the tool engagement surfaces 154 are the perimeter faces of the head 18 that make up the hexagonal shape, though other configurations can be used. In one alternative construction, not specifically shown, the radially extending engagement members 146 can be replaced with one or more engagement member (not shown) that extends axially down into the mold cavity 142 to engage one or more recesses in an axial end of the fastener (not specifically shown).

Figure 5:
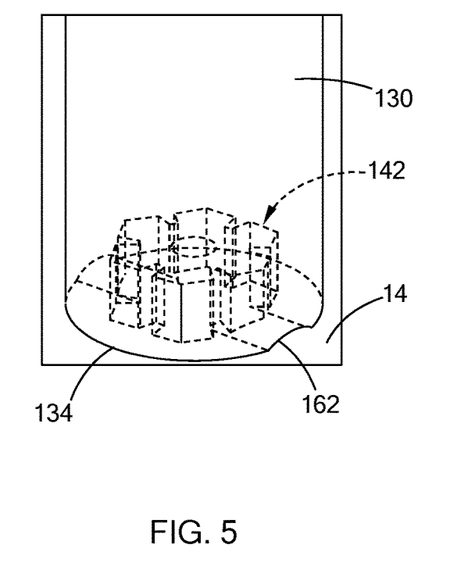
FIG. 5 is a perspective view of a portion of the driver of FIG. 1, illustrating optional vent features in accordance with the teachings of the present disclosure.

Returning to the example provided, the spindle 130 also defines a fluid passageway 158 having an outlet open to the mold cavity 142 and an inlet in fluid communication with the injector 122 to receive the liquid electrically insulating material therefrom. The spindle may also optionally define one or more vents to allow air to be displaced from the mold cavity 142 when the liquid material is injected into the mold cavity 142. In the example shown in FIG. 3, the spindle 130 lacks such vents, but the tolerances of the distal end 134 of the spindle 130 and the component 14 can be such that air can escape between the distal end 134 and the component 14, or the distal end 134 can be held in a position such that a slight air gap is permitted between the distal end 134 and the component 14. Referring to FIG. 5, one example configuration of the optional vents is illustrated in which the distal end 134 of the spindle 130 defines one or more vent channels 162 extending radially through the spindle 130 into the mold cavity 142.

In operation, the spindle 130 is lowered onto the fastener 10 so that the head 18 of the fastener 10 is received in the mold cavity 142, as shown in FIG. 3. The motor 118 is then operated to rotate the spindle 130 and tighten the fastener 10 to a desired torque. With the spindle 130 remaining in the position shown in FIG. 3, the injector 122 is operated to provide liquid material through the fluid passageway 158 and into the mold cavity 142. The liquid material fills the mold cavity 142 and is allowed to solidify around the head 18. The spindle 130 can remain in this position until the material is solidified sufficiently to retract the spindle 130.

Figure 4:
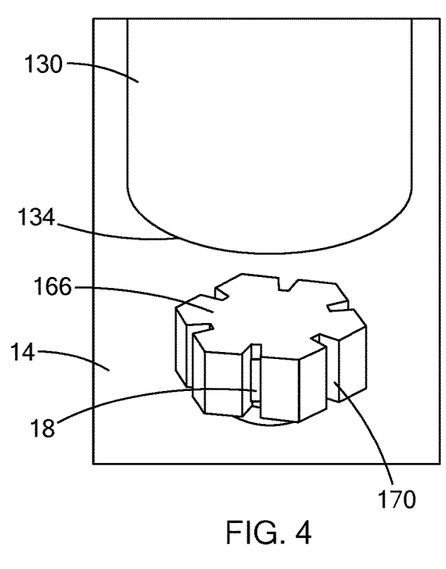
FIG. 4 is a perspective view of the head of the fastener of FIG. 1 in a fully installed condition.

Referring to FIG. 4, the solidified electrically insulating material forms an electrically insulating cap 166 over the head 18 of the fastener 10. In the example provided, the cap 166 includes a plurality of gaps 170 as a result of the engagement members 146. However, these gaps 170 are sufficiently small enough to inhibit unintentional contact (e.g., by a person's fingers) with the fastener 10.

The shape of the mold cavity 142 dictates the shape of the cap 166 such that the mold cavity 142 shape can control the ability to loosen the fastener 10 with standard tools (e.g., hexagonal shape) proprietary tools (not specifically shown), or to make it more difficult for a user to loosen the fastener 10 without first removing the cap 166 (e.g., round shape). Additionally, the shape of the mold cavity 142 can hide or disguise the fastener from being recognized as a removable or serviceable part.

Figure 6:
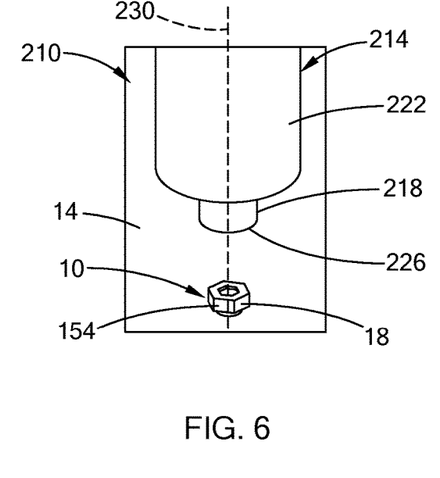
FIG. 6 is a perspective view of a driver of a second construction in accordance with the teachings of the present disclosure, illustrating an example of a fastener to be installed.

Referring to FIG. 6, a portion of a tool 210 of a second construction is illustrated positioned above the example fastener 10 and the component 14. The tool 210 is similar to the tool 110 (FIGS. 1-5), except as otherwise shown or described herein. The tool 210 includes a driver head 214 and the motor 118 (FIG. 1). The tool 210 can also include the injector 122 (FIG. 1). The driver head 214 is similar to the driver head 114 (FIGS. 1-5) except as otherwise shown or described herein. In the example provided, the driver head 214 includes a spindle 218 and a sleeve 222.

The spindle 218 has a distal end 226 generally configured to impart torque to the fastener 10. The motor 118 is drivingly coupled to the spindle 218 to rotate the spindle 218 about the rotational axis 230. With additional reference to FIG. 7, the distal end 226 of the spindle 218 includes a plurality of drive surfaces 234 configured to engage the tool engagement surfaces 154 of the fastener 10. In the example provided, the drive surfaces 234 define a hexagonal recess 238 open through the distal end 226 of the spindle 218, though other mating configurations can be used.

Figure 7:
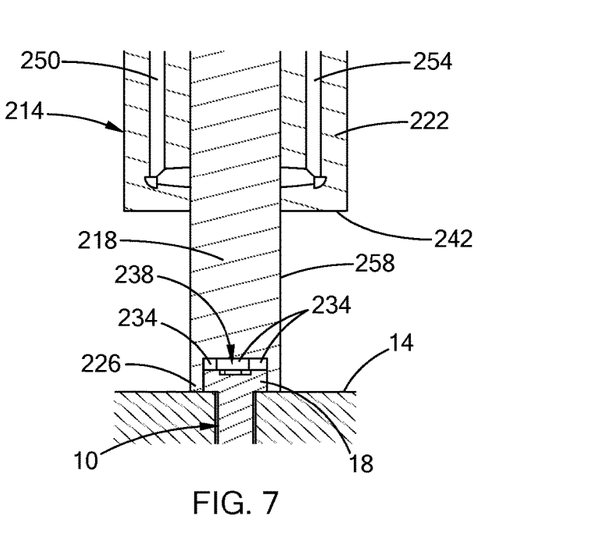
FIG. 7 is a cross-sectional view of a portion of the driver of FIG. 6 in a first mode.

In one alternative construction, not specifically shown, the recess 238 can be replaced with one or more engagement members (not shown) that extend axially down to define the drive surfaces to engage one or more recesses in an axial end of a fastener (not specifically shown).

Figure 8:
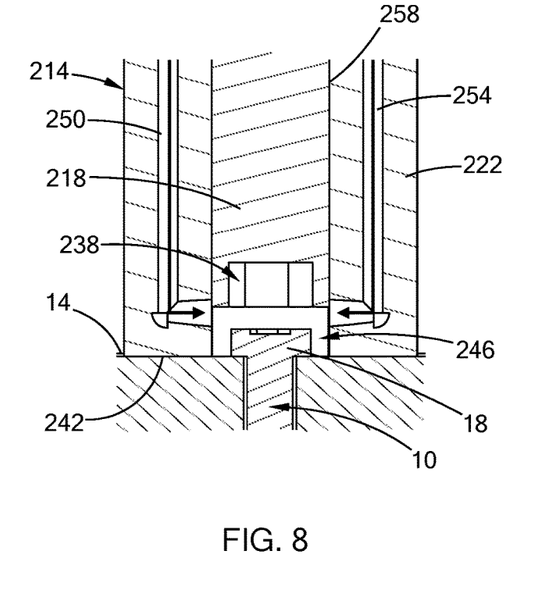
FIG. 8 is a cross-sectional view of the portion of the driver of FIG. 6, illustrated in a second mode.
Figure 9:
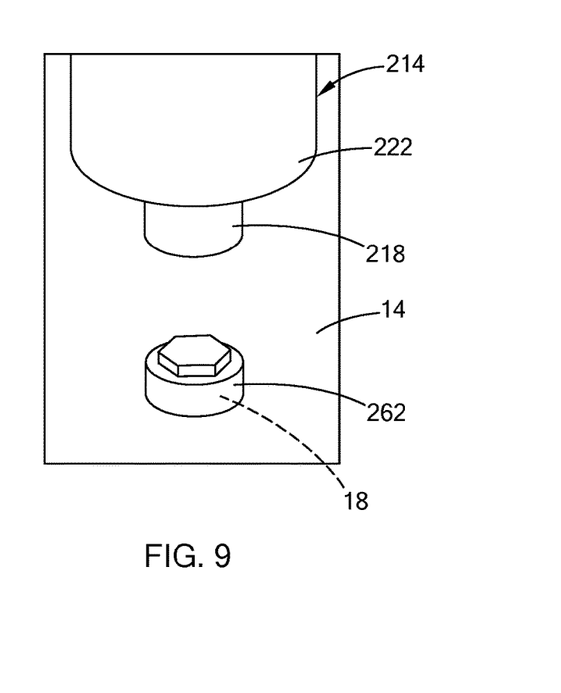
FIG. 9 is a perspective view of the head of the fastener of FIG. 6 in a fully installed condition.

Referring to FIGS. 7 and 8, the sleeve 222 is disposed coaxially about the spindle 218. The spindle 218 is axially slidable relative to the sleeve 222 between a driving position (e.g., shown in FIG. 7) and a molding position (e.g., shown in FIG. 8). In the driving position, the distal end 226 of the spindle 218 can engage the fastener 10. In the example provided, the distal end 226 is extended beyond a distal end 242 of the sleeve 222. Alternatively, the distal ends 226, 242 can be flush while still permitting engagement of the fastener 10. In the molding position, the distal end 226 of the spindle 218 is retracted into the sleeve 222 so that the sleeve 222 and the distal end 226 of the spindle 218 define a mold cavity 246 configured to encapsulate the head 18 of the fastener 10. In the example provided, the mold cavity 246 is generally cylindrical except for the portion defined by the recess 238, as shown in FIGS. 8 and 9, though other shapes can be used. In the example provided, the spindle 218 is configured to rotate relative to the sleeve 222, though the sleeve 222 could be configured to rotate with the spindle 218.

The sleeve 222 defines one or more fluid passageways. In the example provided, the sleeve 222 defines a first fluid passageway 250 and a second fluid passageway 254 and each is coupled to the injector 122 to receive the liquid material therefrom. Each fluid passageway 250, 254 has an outlet open into the mold cavity 246 when the spindle 218 is in the molding position. When the spindle 218 is in the driving position, an outer surface 258 of the spindle 218 can close off and seal the outlets of the fluid passageways 250, 254.

In the example shown, the spindle 218 and the sleeve 222 lack vents, but the tolerances between the spindle 218 and the sleeve 222 and/or between the distal end 242 of the sleeve 222 and the component 14 can be such that air can escape therebetween, or the sleeve 222 can be held in a position such that a slight air gap is permitted between the distal end 242 of the sleeve 222 and the component 14. In an alternative construction, not specifically shown, the sleeve 222 can include vent channels similar to those illustrated in FIG. 5 extending radially through the sleeve 222 into the mold cavity 246. In another alternative configuration, the first fluid passageway 250 is coupled to the injector 122 and the second fluid passageway 254 is open to the exterior of the tool 210 to act as a vent.

In operation, the spindle 218 is positioned in the driving position and lowered onto the fastener 10 so that the head 18 is engaged by the spindle 218, as shown in FIG. 7. The motor 118 (FIG. 1) is then operated to rotate the spindle 218 and tighten the fastener 10. The spindle 218 is then moved to the molding position with the head 18 encapsulated by the mold cavity 246, as shown in FIG. 8. The injector 122 (FIG. 1) then provides liquid material through the passageways 250, 254 and into the mold cavity 246. The liquid material fills the mold cavity 246 and is allowed to solidify around the head 18. The driver head 214 can remain in this position until the material solidifies sufficiently to retract the driver head 214, as shown in FIG. 9. Referring to FIG. 9, the solidified electrically insulating material forms an electronically insulating cap 262 over the head 18 of the fastener 10.

Figure 10:
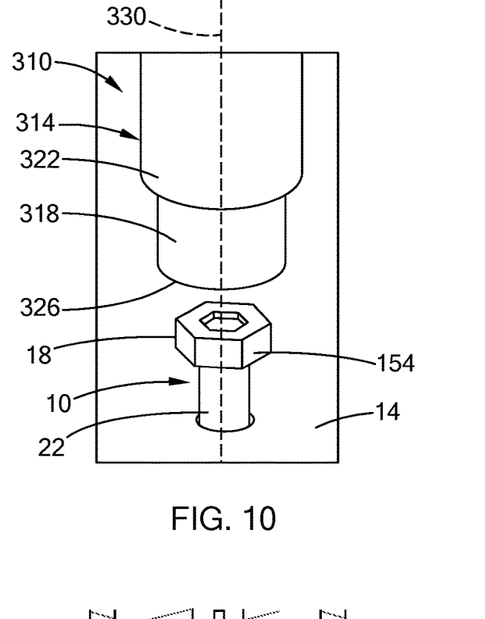
FIG. 10 is a perspective view of a driver of a third construction in accordance with the teachings of the present disclosure, illustrating an example of a fastener to be installed.

Referring to FIG. 10, a portion of a tool 310 of a third construction is illustrated positioned above the example fastener 10 and the component 14. The tool 310 is similar to the tool 210 (FIGS. 6-9), except as otherwise shown or described herein. The tool 310 includes a driver head 314 and the motor 118 (FIG. 1). The tool 310 can also include the injector 122 (FIG. 1). The driver head 314 is similar to the driver head 214 (FIGS. 6-9) except as otherwise shown or described herein. The driver head 314 includes a spindle 318 and a sleeve 322.

The spindle 318 has a distal end 326 generally configured to impart torque to the fastener 10. The motor 118 (FIG. 1) is drivingly coupled to the spindle 318 to rotate the spindle 318 about the rotational axis 330. With additional reference to FIG. 11, the distal end 326 of the spindle 318 includes a plurality of drive surfaces 334 configured to engage the tool engagement surfaces 154 of the fastener 10. In the example provided, the drive surfaces 334 define a hexagonal recess 338 open through the distal end 326 of the spindle 318, though other mating configurations can be used. The spindle 318 also defines a fluid passageway 342 that has an inlet coupled to the injector 122 and an outlet open into the recess 338.

Figure 11:
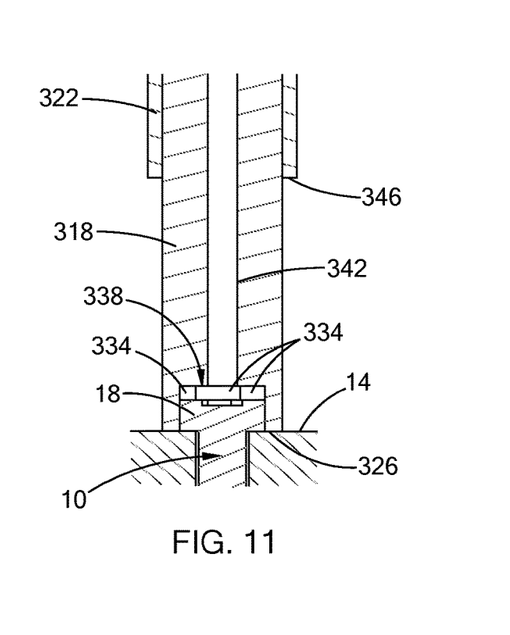
FIG. 11 is a cross-sectional view of a portion of the driver of FIG. 10 in a first mode.
Figure 12:
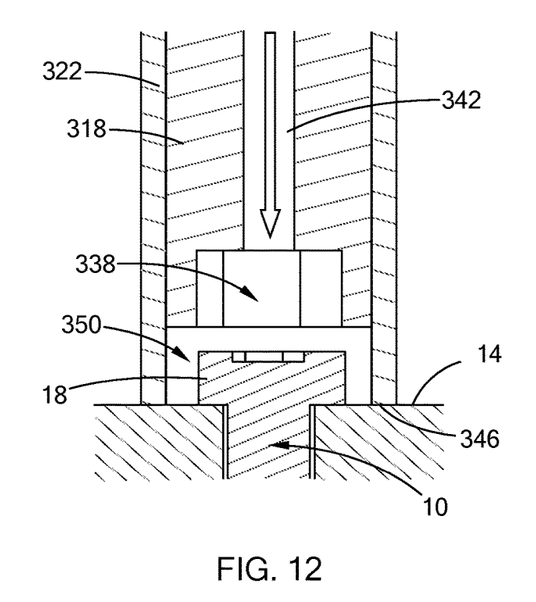
FIG. 12 is a cross-sectional view of the portion of the driver of FIG. 10, illustrated in a second mode.

Referring to FIGS. 11 and 12, the sleeve 322 is disposed coaxially about the spindle 318. The spindle 318 is axially slidable relative to the sleeve 322 between a driving position (e.g., shown in FIG. 11) and a molding position (e.g., shown in FIG. 12). In the driving position, the distal end 326 is extended beyond or flush with a distal end 346 of the sleeve 322 to engage the fastener 10. In the molding position, the distal end 326 of the spindle 318 is retracted into the sleeve 322 so that the sleeve 322 and the distal end 326 of the spindle 318 define a mold cavity 350 that can encapsulate the head 18 of the fastener 10.

Figure 13:
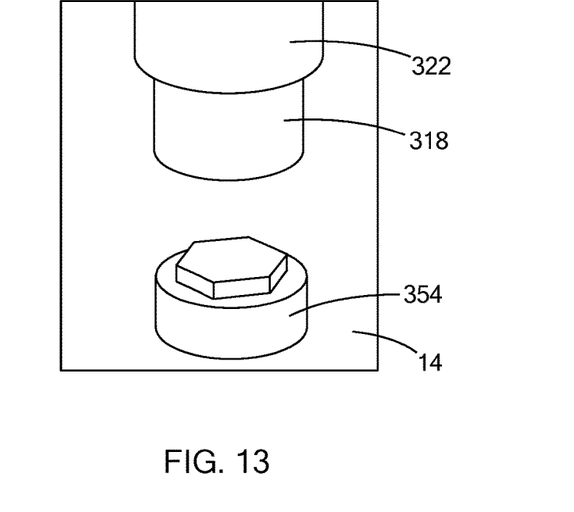
FIG. 13 is a perspective view of the head of the fastener of FIG. 10 in a fully installed condition.

In the example provided, the mold cavity 350 is generally cylindrical except for the portion defined by the recess 338, as shown in FIGS. 12 and 13, though other shapes can be used. Thus, in the example provided, the recess 338, forms part of the mold cavity 350 and the fluid passageway 342 is open to the mold cavity 350. In the example provided, the spindle 318 is configured to rotate relative to the sleeve 322, though the sleeve 322 could be configured to rotate with the spindle 318.

In an alternative construction, not specifically shown, the recess 338 can be replaced with one or more engagement member (not shown) that extends axially down to define the drive surfaces to engage one or more recesses in an axial end of a fastener (not specifically shown).

In the example shown, the spindle 318 and sleeve 322 lack vents, but the tolerances of the parts can provide sufficient venting as described above. In an alternative construction, not shown, the sleeve 322 can include vent channels (e.g., similar to those shown in FIG. 5) extending radially through the sleeve 322 into the mold cavity 350, or a vent passageway can be defined by the spindle 318 and/or the sleeve 322.

In operation, the spindle 318 is positioned in the driving position and lowered onto the fastener 10 to engage the head 18, as shown in FIG. 11. The motor 118 (FIG. 1) is then operated to rotate the spindle 318 and tighten the fastener 10. The spindle 318 is then moved to the molding position with the head 18 encapsulated by the mold cavity 350, as shown in FIG. 12. The injector 122 (FIG. 1) then provides the liquid material through the passageway 342 and into the mold cavity 350. The liquid material fills the mold cavity 350 and is allowed to solidify around the head 18. The driver head 314 can remain in this position until the liquid material solidifies sufficiently to retract the driver head 314, as shown in FIG. 13. Referring to FIG. 13, the solidified electrically insulating material forms an electronically insulating cap 354 over the head 18 of the fastener 10.

Figures 14, 15:
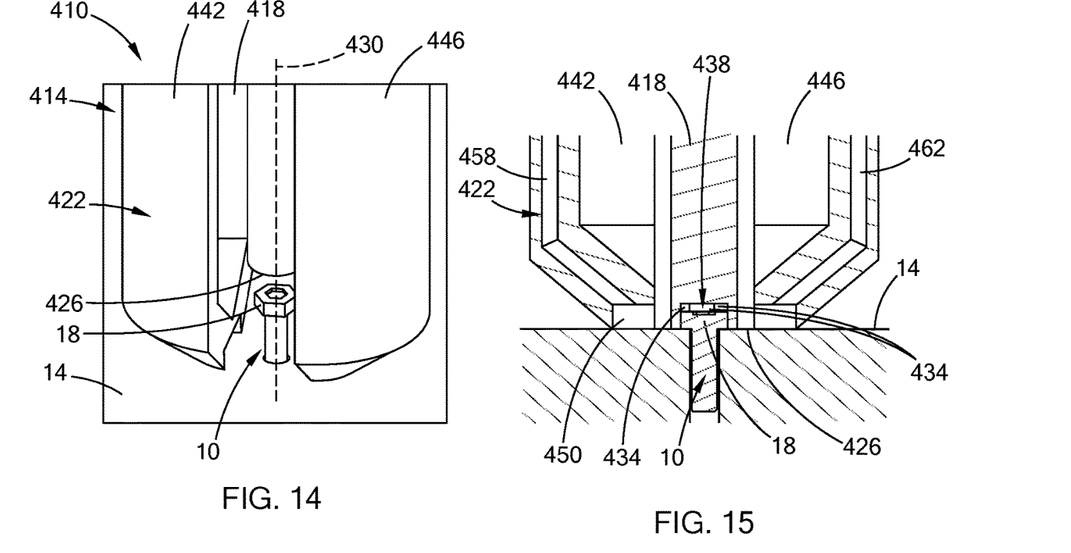
FIG. 14 is a perspective view of a driver of a fourth construction in accordance with the teachings of the present disclosure, illustrating an example of a fastener to be installed.
FIG. 15 is a cross-sectional view of a portion of the driver of FIG. 14 in a first mode.

Referring to FIG. 14, a portion of a tool 410 of a fourth construction is illustrated positioned above the example fastener 10 and the component 14. The tool 410 is similar to the tool 210 (FIGS. 6-9), except as otherwise shown or described herein. The tool 410 includes a driver head 414 and the motor 118 (FIG. 1). The tool 410 can also include the injector 122 (FIG. 1). The driver head 414 is similar to the driver head 214 (FIGS. 6-9) except as otherwise shown or described herein. The driver head 414 includes a spindle 418 and a sleeve 422.

The spindle 418 has a distal end 426 generally configured to impart torque to the fastener 10. The motor 118 (FIG. 1) is drivingly coupled to the spindle 418 to rotate the spindle 418 about the rotational axis 430. With additional reference to FIG. 15, the distal end 426 of the spindle 418 includes a plurality of drive surfaces 434 configured to engage the tool engagement surfaces 154 of the fastener 10. In the example provided, the drive surfaces 434 define a hexagonal recess 438 open through the distal end 426 of the spindle 418, though other mating configurations can be used.

In an alternative construction, not specifically shown, the recess 438 can be replaced with one or more engagement members (not shown) that extend axially down to define the drive surfaces to engage one or more recesses in an axial end of the fastener (not specifically shown).

Figure 16:
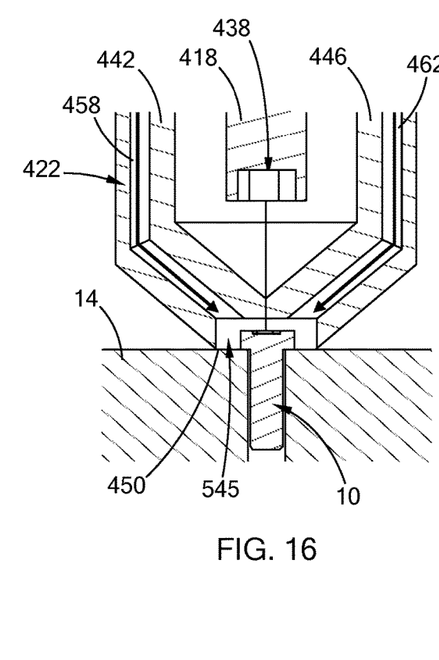
FIG. 16 is a cross-sectional view of the portion of the driver of FIG. 14, illustrated in a second mode.

Referring to FIGS. 15 and 16, the sleeve 422 is disposed coaxially about the spindle 418 and is formed from a plurality of sleeve sections. In the example provided, the sleeve 422 is formed of two sleeve sections 442, 446 that form halves of the sleeve 422, though the sleeve 422 could include more than two sections. The sleeve sections 442, 446 are configured to move radially relative to the spindle 418 and the spindle 418 is axially movable relative to the sleeve 422 such that the driver head 414 can be changed between a driving position (e.g., shown in FIG. 15) and a molding position (e.g., shown in FIG. 16).

In the driving position, the sleeve sections 442, 446 are more radially apart than when in the molding position. In the driving position, the distal end 426 of the spindle 418 is flush with or extends beyond a distal end 450 of the sleeve 422 to engage the fastener 10.

Figure 17:
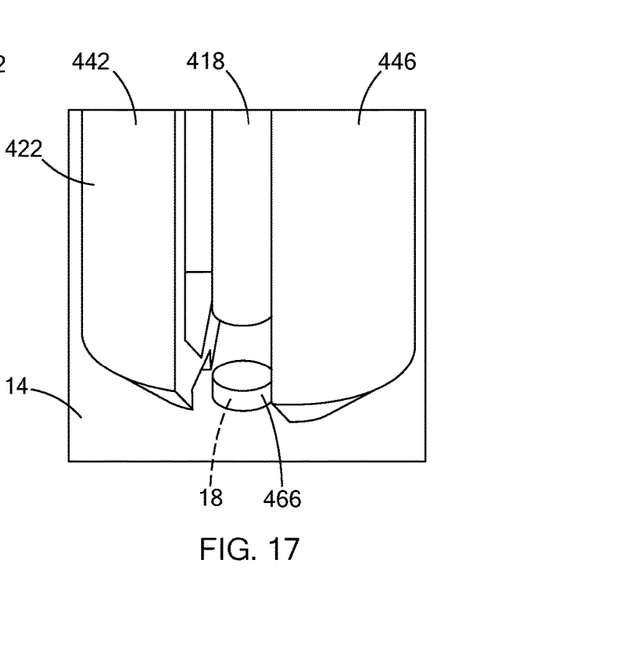
FIG. 17 is a perspective view of the head of the fastener of FIG. 14 in a fully installed condition.

In the molding position, the distal end 426 of the spindle 418 is retracted up into the sleeve 422 and the sleeve sections 442, 446 are moved radially inward so that the sleeve sections 442, 446 contact each other and define a mold cavity 454 configured to encapsulate the head 18 of the fastener 10. In the example provided, no part of the spindle 418 defines the mold cavity 454. The mold cavity 454 can be generally cylindrical, as shown in FIGS. 16 and 17, though other shapes can be used. In the example provided, the spindle 418 is configured to rotate relative to the sleeve 422, though the sleeve 422 could be configured to rotate with the spindle 418.

The sleeve 422 defines one or more fluid passageways. In the example provided, the sleeve section 442 defines a first fluid passageway 458 and the sleeve section 446 defines a second fluid passageway 462 and each fluid passageway 458, 462 is coupled to the injector 122 to receive the liquid material therefrom. Each fluid passageway 458, 462 has an outlet open into the mold cavity 454 when the driver head 414 is in the molding position.

In the example shown, the sleeve 422 lack vents, but the tolerances of the parts can provide sufficient venting as described above. In an alternative construction, not specifically shown, the sleeve 422 can include vent channels (e.g., similar to those shown in FIG. 5) extending radially through the sleeve 422 into the mold cavity 454, or a vent passageway can be defined by the sleeve 422.

In operation, the driver head 414 is positioned in the driving position and lowered so the spindle 418 engages the fastener 10, as shown in FIG. 15. The motor 118 (FIG. 1) is then operated to rotate the spindle 418 and tighten the fastener 10. The driver head 414 is then moved to the molding position with the head 18 encapsulated by the mold cavity 454, as shown in FIG. 16. The injector 122 (FIG. 1) then provides liquid material through the passageways 458, 462 and into the mold cavity 454. The liquid material fills the mold cavity 454 and is allowed to solidify around the head 18. The driver head 414 can remain in this position until the material solidifies sufficiently to retract the driver head 414, as shown in FIG. 17. Referring to FIG. 17, the solidified electrically insulating material forms an electronically insulating cap 466 over the head 18 of the fastener 10.

Figure 18:
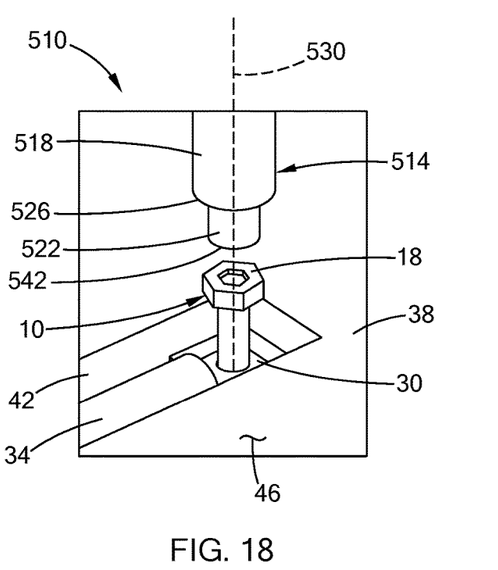
FIG. 18 is a perspective view of a driver of a fifth construction in accordance with the teachings of the present disclosure, illustrating an example of a fastener to be installed.

Referring to FIG. 18, a portion of a tool 510 of a fifth construction is illustrated positioned above an example fastener 10 and a component 38. The component 38 is one example of a different configuration of the component 14 (FIG. 1). The component 38 defines a terminal channel 42 recessed from an outer surface 46 of the component 38. The electrical cable 34 extends along the terminal channel 42 and the electrical terminal 30 is coupled to the end of the cable 34 for electrical communication therewith. The fastener 10 is configured to affix the terminal 30 to the component 38.

The tool 510 is similar to the tool 210 (FIGS. 6-9), except as otherwise shown or described herein. The tool 510 includes a driver head 514 and the motor 118 (FIG. 1). The tool 510 can also include the injector 122 (FIG. 1). The driver head 514 is similar to the driver head 214 (FIGS. 6-9) except as otherwise shown or described herein. In the example provided, the driver head 514 includes a spindle 518 and an injection shaft 522.

The spindle 518 has a distal end 526 generally configured to impart torque to the fastener 10. The motor 118 (FIG. 1) is drivingly coupled to the spindle 518 to rotate the spindle 518 about the rotational axis 530. With additional reference to FIG. 19, the distal end 526 of the spindle 518 includes a plurality of drive surfaces 534 configured to engage the tool engagement surfaces 154 of the fastener 10. In the example provided, the drive surfaces 534 define a hexagonal recess 538 open through the distal end 526 of the spindle 518, though other mating configurations can be used.

Figure 19:
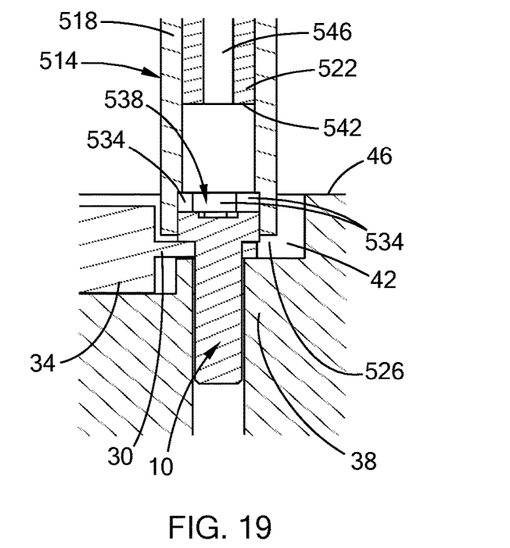
FIG. 19 is a cross-sectional view of a portion of the driver of FIG. 18 in a first mode.

In an alternative construction, not specifically shown, the recess 538 can be replaced with one or more engagement members (not shown) that extend axially down to define the drive surfaces to engage one or more recesses in an axial end of the fastener (not specifically shown).

Figure 20:
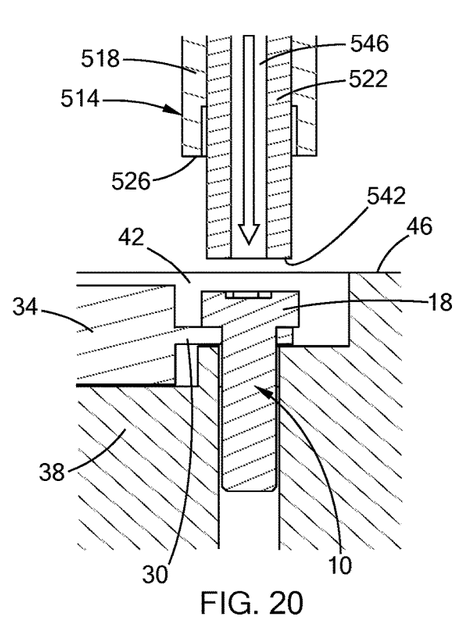
FIG. 20 is a cross-sectional view of the portion of the driver of FIG. 18, illustrated in a second mode.

Referring to FIGS. 19 and 20, the spindle 518 is disposed coaxially about the injection shaft 522. The injection shaft 522 is axially slidable relative to the spindle 518 between a driving position (e.g., shown in FIG. 19) and a molding position (e.g., shown in FIG. 20). In the driving position, the distal end 526 of the spindle 518 is configured to engage the fastener 10 and the injection shaft 522 is retracted up into the spindle 518. In the molding position, a distal end 542 of the injection shaft 522 is extended to be either flush with or extended beyond the distal end 526 of the spindle 518. In the example provided, the spindle 518 is configured to rotate relative to the injection shaft 522, though in an alternative configuration, the injection shaft 522 could rotate with the spindle 518.

The injection shaft 522 defines one or more fluid passageways. In the example provided, the injection shaft 522 defines a central fluid passageway 546 that is coupled to the injector 122 to receive the liquid material therefrom. The fluid passageway 546 has an outlet open through the distal end 542 of the injection shaft 522.

Figure 21:
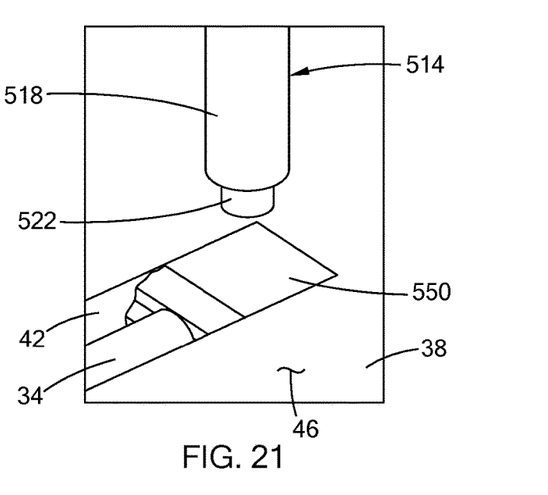
FIG. 21 is a perspective view of the head of the fastener of FIG. 18 in a fully installed condition.

In operation, the spindle 518 is positioned in the driving position and lowered to engage the fastener 10, as shown in FIG. 19. The motor 118 (FIG. 1) is then operated to rotate the spindle 518 and tighten the fastener 10. The spindle 518 is then moved to the molding position with the head 18 directly below the injection shaft 522, as shown in FIG. 20. The injector 122 (FIG. 1) then provides liquid material through the passageway 546 and onto the fastener head 18 and terminal 30 within the terminal channel 42. The liquid material can fill the terminal channel 42 around the fastener 10 and the terminal 30 and is allowed to solidify therein to form an electrically insulating cap 550 over the head 18 of the fastener 10, as shown in FIG. 21.

Figure 22:
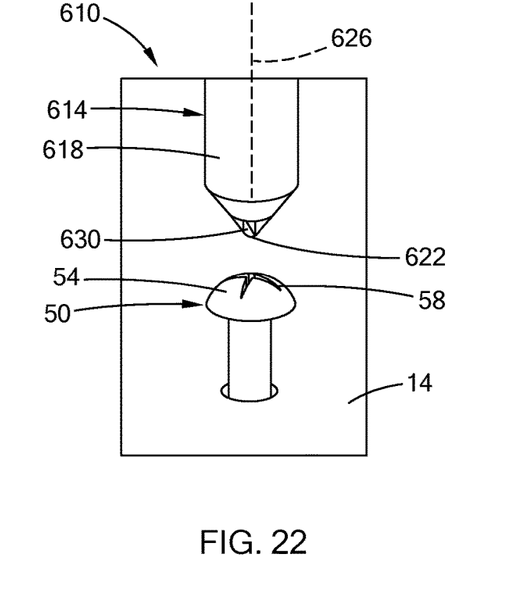
FIG. 22 is a perspective view of a driver of a sixth construction in accordance with the teachings of the present disclosure, illustrating an example of a fastener to be installed.

Referring to FIG. 22, a portion of a tool 610 of a sixth construction is illustrated positioned above an example fastener 50. The fastener 50 is similar to the fastener 10 (FIG. 1) except that a head 54 of the fastener 50 specifically includes internal tool engagement surfaces 58 recessed within the axial end of the head 54. The tool 610 is similar to the tool 310 (FIGS. 10-13), except as otherwise shown or described herein. The tool 610 includes a driver head 614 and the motor 118 (FIG. 1). The tool 610 can also include the injector 122 (FIG. 1). The driver head 614 is similar to the driver head 314 (FIGS. 10-13) except as otherwise shown or described herein. In the example provided, the driver head 614 includes a spindle 618, but lacks the sleeve 322 (FIGS. 10-13).

Figure 23:
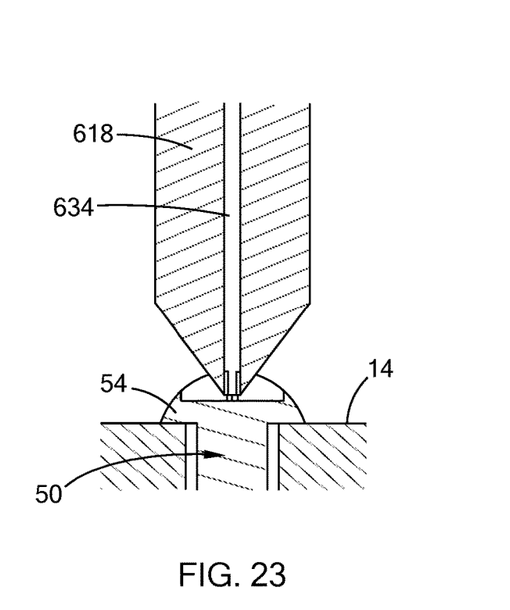
FIG. 23 is a cross-sectional view of a portion of the driver of FIG. 22 in a first mode.

The spindle 618 has a distal end 622 configured to impart torque to the fastener 50. The motor 118 (FIG. 1) is drivingly coupled to the spindle 618 to rotate the spindle 618 about the rotational axis 626. With reference to FIGS. 22 and 23, the distal end 622 of the spindle 618 includes a plurality of protrusions having drive surfaces 630 configured to be received into the axial end of the head 54 to engage the tool engagement surfaces 58 of the fastener 50. In the example provided, the drive surfaces 630 define a cross or plus-shaped protrusion, though other mating configurations can be used. The spindle 618 also defines a fluid passageway 634 that has an inlet coupled to the injector 122 and an outlet open through the distal end 622 of the spindle. In the example provided, the fluid passageway is coaxial with the axis 626.

Figure 24:
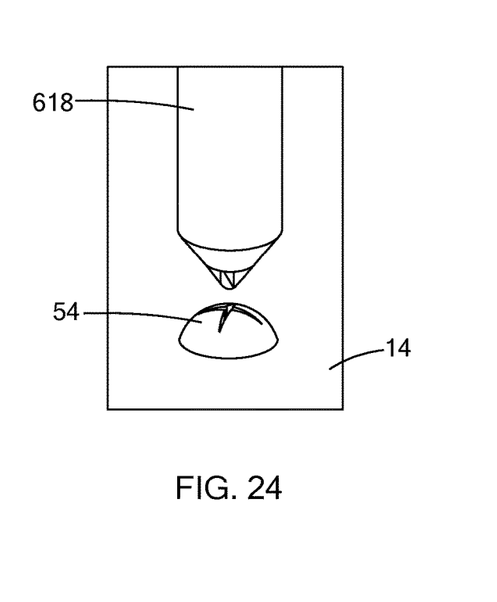
FIG. 24 is a cross-sectional view of the portion of the driver of FIG. 22, illustrated in a second mode.
Figure 25:
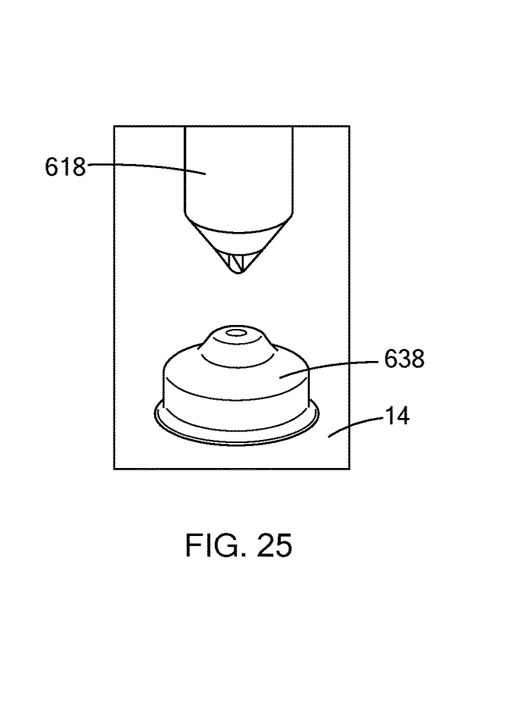
FIG. 25 is a perspective view of the head of the fastener of FIG. 22 in a fully installed condition.

In operation, the spindle 618 is positioned in a driving position in which the spindle 618 is lowered onto the fastener 50 so that the head 54 is engaged by the spindle 618, as shown in FIG. 23. The motor 118 (FIG. 1) is then operated to rotate the spindle 618 and tighten the fastener 50. The spindle 618 is then moved to a molding position above the head 54, as shown in FIG. 24. The injector 122 (FIG. 1) can be operated to provide liquid material through the passageway 634 and onto the head 54 while the spindle 618 is retracting or after reaching a predetermined distance from the head 54. The liquid material completely covers the head 54 and is allowed to solidify around the head 54, as shown in FIG. 25. Referring to FIG. 25, the solidified electrically insulating material forms an electronically insulating cap 638 over the head 54 of the fastener 50.

In an alternative configuration, not specifically shown, the driver head 614 can include a sleeve similar to the sleeve 322 (FIGS. 10-13) disposed coaxially about the spindle 618. Operation of such a configuration would be similar to that described above with reference to FIGS. 10-13.

As used herein, the phrase at least one of A, B, and C should be construed to mean a logical (A OR B OR C), using a non-exclusive logical OR, and should not be construed to mean "at least one of A, at least one of B, and at least one of C."

Unless otherwise expressly indicated, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, examples that do not depart from the substance of the disclosure are intended to be within the scope of the disclosure. Such examples are not to be regarded as a departure from the spirit and scope of the disclosure. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A tool for driving a threaded fastener, the tool comprising:
   a driver head comprising a spindle rotatable about an axis, a distal end of the spindle defining a plurality of drive surfaces configured to engage mating drive surfaces on the fastener to rotate the fastener about the axis and a mold cavity radially outward of the drive surfaces and configured to be open to the fastener while the drive surfaces rotate the fastener, the driver head defining a fluid passage having an outlet proximate to the distal end of the spindle;
   a motor drivingly coupled to the spindle to rotate the spindle about the axis; and
   an injector coupled to an inlet of the fluid passage and configured to feed a liquid insulator through the fluid passage to the mold cavity while the spindle remains in a position such that rotation of the spindle about the axis would rotate the fastener via the drive surfaces.

2. The tool according to claim 1, wherein the spindle defines the fluid passage and the outlet opens to the mold cavity.

3. The tool according to claim 1, wherein the drive surfaces are disposed on walls that extend radially inward from perimeter walls of the mold cavity.

4. The tool according to claim 1, wherein the drive surfaces are disposed on at least one protrusion of the distal end of the spindle, the at least one protrusion configured to be received in at least one recess of the fastener.

5. The tool according to claim 4, wherein the spindle defines the fluid passage coaxial with the axis.

6. The tool according to claim 1, wherein the driver head further comprises a sleeve axially translatable relative to the spindle and disposed coaxially about the spindle, the sleeve at least partially defining a mold cavity that encapsulates a tool engagement portion of the fastener.

7. The tool according to claim 6, wherein the sleeve defines the fluid passage.

8. The tool according to claim 6, wherein the spindle at least partially defines the mold cavity.

9. The tool according to claim 6, wherein the sleeve includes a plurality of sleeve members that are radially movable relative to the spindle between a first radial position and a second radial position, wherein when the sleeve members are in the second radial position the sleeve members are closer to the axis than when in the first radial position and the sleeve members cooperate to at least partially define the mold cavity.

10. The tool according to claim 6, wherein the mold cavity has a perimeter shape that is different than a perimeter shape of the tool engagement portion of the fastener.

11. The tool according to claim 1, wherein the drive head further comprises an injection shaft that defines the fluid passage and is axially translatable relative to the spindle, wherein the spindle is disposed coaxially about the injection shaft.

* * * * *